INVENTORS
Robert N. Knosp
Carl E. Linden
Frank O. Wetzel
BY Wood, Arey, Herron & Evans
ATTORNEYS.

June 17, 1952 R. N. KNOSP ET AL 2,600,779
CONTROL MECHANISM FOR TAPPING MACHINES
Filed July 23, 1948 5 Sheets-Sheet 3

INVENTORS
Robert N. Knosp
Carl E. Linden
BY Frank O. Wetzel
Wood, Arey, Herron & Evans
ATTORNEYS.

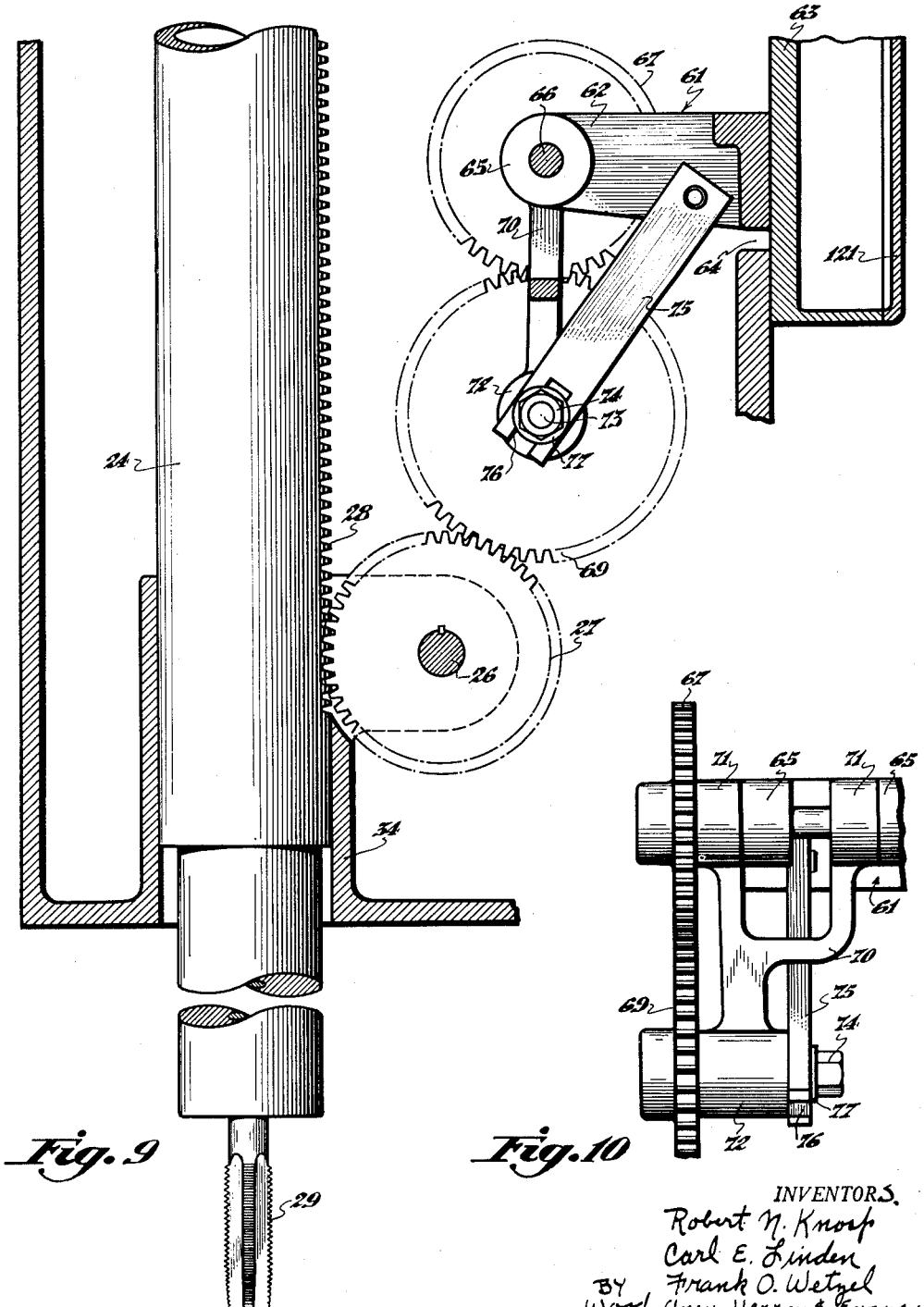

Patented June 17, 1952

2,600,779

UNITED STATES PATENT OFFICE 2,600,779

CONTROL MECHANISM FOR TAPPING MACHINES

Robert N. Knosp, Ludlow, Ky., and Carl E. Linden, Cincinnati, and Frank O. Wetzel, Norwood, Ohio, assignors to The Fosdick Machine Tool Company, Cincinnati, Ohio, a corporation of Ohio Application July 23, 1948, Serial No. 40,298

9 Claims. (Cl. 10—136)

This invention relates to improvements in tapping or drilling machinery. More particularly, the invention is directed to the improvement of the controls for the tap driving spindle, whereby the depth of tapping may be automatically controlled.

In the art of tapping, the operator starts the tap into the hole to be threaded, and thereafter the tap automatically feeds or threads itself into the hole. When the appropriate depth has been reached, the operator reverses the rotation of the spindle through a manual control for this purpose, and the tap unthreads itself from the hole, translative motion of the spindle ceasing when the tap is clear of the previously formed threads.

Obviously, accurate and precise control of the tapping operation has been difficult, and unless the operator is fully attentive to the movement of the dial, which indicates the translative motion of the spindle, overthreading is apt to occur, and in the case of a blind hole, the tap broken.

It has been the object of the present inventors to provide a machine for tapping or drilling holes which incorporates adjustable dials which will be effective for reversing the direction of spindle rotation at the proper lower and upper limits required by the particular tapping operation.

In the present disclosure, it has been determined that these control dials may be driven from the spindle translating mechanism through back gearing and that they can be adjustably mounted relative to a fixed back drive so as to accomplish reversing of the motor, which drives the spindle, at any point. Such operation may be accomplished by means of dogs on the dials effective for operating switches through leverages, and thus, controlling the electric circuit to the motor.

It has been a further object of the present inventors to provide dials controlling the switches, which dials are visible at the front of the drill head at a convenient point for setting, and may be conveniently locked in respect to their drive shaft in accordance with the operator's calculations, particularly of the depth of the tapping operation which is the critical movement to be controlled.

It has been a still further object of the present inventors to provide a control circuit for the electric motor which may be either manually or automatically actuated, wherein a switch is provided for shifting the control from use as a tapping machine to use as a drilling machine.

Other objects and advantages relate to the controls for accomplishing the above results, both electrically and mechanically, wherein it is impossible for the operator to start the motor accidentally as he moves the spindle up and down in setting up the machine. The relays which control the motor are dependent upon the movement of a main control lever, and until this lever is manually moved to position to start the motor, the automatic mechanism will not function.

Other objects and certain advantages will be more fully apparent from the description of the drawings in which:

Figure 9 is a fragmentary sectional view taken on line 9—9, Figure 3, illustrating the gear train extending from the spindle to the shaft which drives the feed control dials.

Figure 10 is a fragmentary view illustrating a portion of the gearing of Figure 9, particularly depicting the bracket which supports the gearing.

Figure 1:
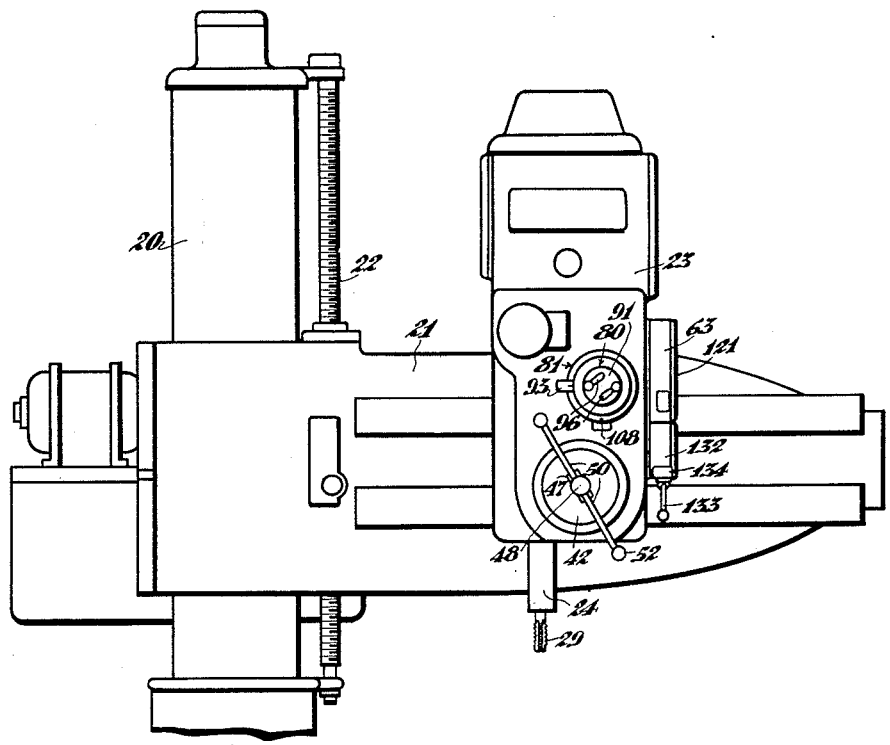
Figure 1 is a fragmentary front view of a radial drill embodying a drill head incorporating the present improvements.

The present invention is illustrated in its application to a radial drill of standard structure. This type of drilling machine, as shown in Figure 1, includes a column 20 and an arm 21. The column is rotatively mounted on a stump (not shown) and the arm swings with it. The arm is raised and lowered on the column by means of an elevating screw 22 disposed along the column. The arm carries a drill head unit 23 supported thereon for horizontal adjustment. The present improvements are, as stated, directed to the control of the translatory movement of the drill or tap spindle 24 which is mounted within the head. Therefore, the description will be limited to the mechanism mounted upon and within the head for controlling the translatory motion of the spindle in accordance with the objectives heretofore stated.

The drill sprindle 24 is translated either by hand or by power. Both the rotative and translatory motions for the tap or drill are obtained from the same motor. The motor utilized is reversible and it is automatically controlled by means of switches actuated through levers and rotating members which carry dogs, which latter members are adjustable to the desired positions for the proper cycle of translatory movement of the spindle. These elements, which carry the switch operating dogs, are driven through a transmission extended from the gearing which normally drives or translates the spindle, and thus their movements are fully synchronized and effective for accurate control of the spindle translation.

Figure 6:
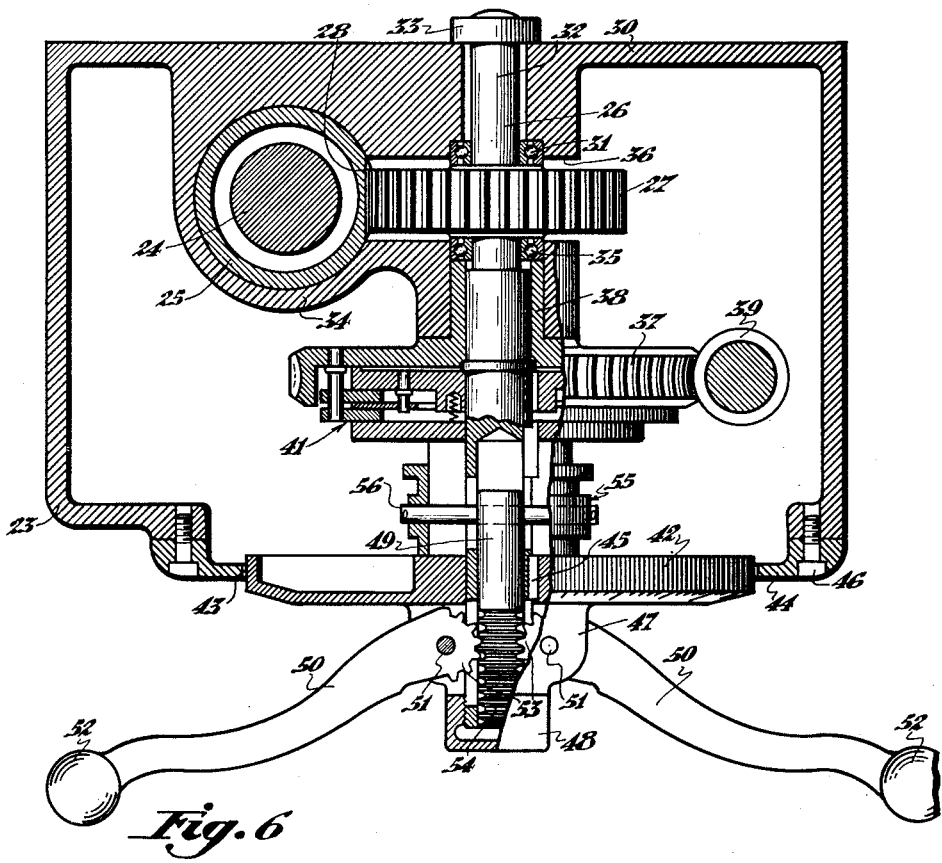
Figure 6 is a sectional view taken on line 6—6, Figure 2, illustrating the spindle translating mechanism and the clutch and operating mechanism for controlling the connection of the power to the spindle translating gearing.

Referring more specifically to the drawings, the mounting and drive for the spindle is illustrated in Figure 6. The drill spindle sleeve is indicated at 25. A drive shaft 26 is mounted horizontally in the forward portion or casing of the drill head and carries a gear 27 engaging rack teeth 28 formed along one side of the drill spindle sleeve, thus providing the connection for conveying translatory movement to the drill spindle sleeve. The drill spindle 24 is mounted within the drill spindle sleeve, the mounting constituting no part of this invention and, therefore, its details are not illustrated. The drill or tap spindle, as shown, carries a conventional tap 29 (Figure 9) in its lower or socket end.

The shaft 26 is journalled in the rear wall 30 of the drill head in a ball bearing 31. It includes a counterturned reduced diameter portion 32 extended through a bore in the wall 30. A collar 33 in pinned to the outer end of the shaft portion 32 and abuts the back wall of the casing. The drill head includes an internal bearing boss or lug 34 which houses or mounts the drill spindle sleeve and provides the bearing for the shaft 26. An additional ball bearing 35 is provided adjacent the front end of the gear 27 for additionally supporting the shaft in the bearing boss 34. The boss is slotted as at 36 to provide clearance for the gear 27, and the bearings 31 and 35 are at respectively opposite sides of the gear.

A worm wheel 37 includes a bearing portion 38 disposed in the boss 34 and traversed by the shaft 26. This gear is loosely mounted on the shaft within the boss. It is driven by means of a worm 39 extended from the reversible motor 40 which moves the spindle for both its translatory and rotative motions.

The motor is illustrated at 40 in the diagrammatic view or the wiring diagram. It is not believed necessary to described or illustrate in detail the transmission of motor power to the worm 39 or to describe in detail the construction of the drill spindle assembly since these mechanisms may be conventional. In the present disclosure, the controls extended to the reversible motor are important since it is the control of this motor through mechanically operated switches which constitutes the essence of the invention along with the mechanism which provides the controls through a transmission synchronized with the translatory motion of the spindle.

A clutch, generally indicated at 41, is provided for connecting the worm wheel 37 to the shaft 26, in other words, for connecting the power for translating the drill or tap spindle. The forward end of the drive shaft 26 carries a dial 42. The dial 42 rotates within an aperture 43 in the face plate or cover 44 of the drill head. It is keyed to the shaft 25 by means of a key 45, and, therefore, rotates with the shaft for indicating the amount of spindle translation. The cover plate 44 is held in position by means of screws 46.

The dial plate includes a forward boss 47, and a cap member 48 is screwed on the extended end of the shaft 26 against the end of the boss. The cap 48 provides clearance for axial translative movement of a clutch operating shaft 49 telescopically mounted within a bore in the forward end of the shaft 26. The boss 47 and the shaft 26 include slots which are diametrically aligned for containing the pivoted ends of the clutch control and spindle feeding hand levers 50—50. These levers are disposed on a diametric line, that is, extend radially on either side of the shaft 26. They are mounted on pivot pins 51—51 fixed in the boss and passing through the inner pivoted ends of the levers. The outer ends of the levers include manipulating knobs 52. The inner ends of the levers include segmental gear portions 53 which mesh with the opposite sides of the clutch operating shaft 49 within circular rack teeth 54 formed in the end of the shaft. Inward and outward swinging movements of the levers cause translatory movement of the shaft 49 and actuation of the clutch for clutching and declutching the power.

The details of the clutch and its operating yoke do not form a part of the present invention and it is believed unnecessary to describe the details of these mechanisms. The clutch yoke is generally indicated at 55 and is moved relative to the clutch by means of the control shaft 49 connected to it by means of a diametric pin 56. The clutch includes the usual conventional plates and operating dogs for producing a connection of the worm wheel 37 and the shaft 26 when the levers 50 are swung outwardly.

As illustrated in Figure 9, the drill spindle 24 is disposed for vertical translation within the head, its lower end being slidably disposed through the bearing boss 34 rising from the base of the drill head. The gear 27, as stated, is fixed to the shaft 26 and is also journalled in the bearing boss 34.

Figure 3:
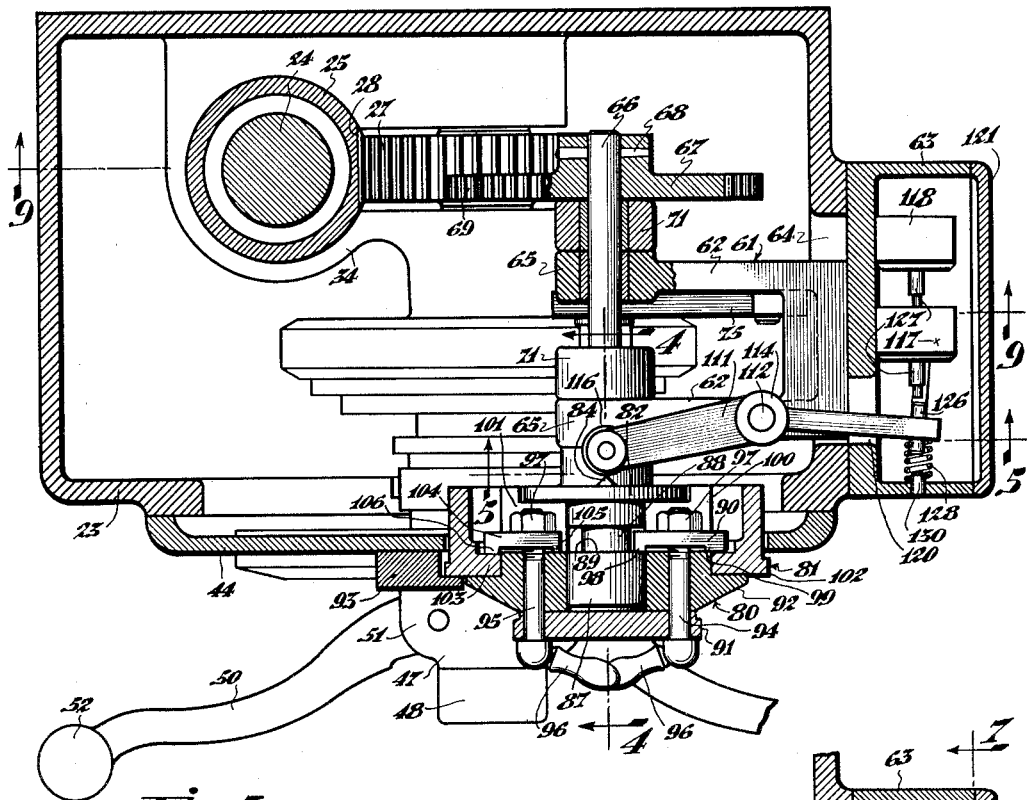
Figure 3 is a sectional view taken on line 3—3, Figure 2, indicating the feed control dials and their driving mechanism as well as the levers and switches operated thereby.

The train of gears which drives the tap spindle control dials and thus operates the switches is best illustrated in Figures 3 and 9. A bearing bracket 61, which includes spaced arms 62, is fastened to the inner face of a switch panel box 63, and the panel box in turn is fixed to the side of the drill head. The fastening means for these elements are conventional and are not illustrated. The side wall of the drill head includes an aperture 64 permitting the attachment of the bracket to the panel box. The arms 62 provide spaced bearings 65—65 supporting the drive shaft 66 for the control dials. A gear 67 is fixed to the inner end of the shaft 66 (Figure 3) by means of a pin 68. This gear meshes with an intermediate gear 69, the gear 69 deriving its motion by meshing engagement with the spindle translating gear 27.

The gear 69 is supported in proper position by means of a hanger bracket 70 (Figure 10). This hanger bracket includes spaced bearing portions 71—71 mounted upon and loosely traversed by the shaft 66. One of these bearing portions is disposed between the inner arm 62 of the bracket 61 and the gear 67, thus appropriately spacing these elements. The other arm of the hanger bracket has its bearing member lying against the inner side of the other arm 62 of the bearing bracket 61. The lower end of the hanger bracket includes a heavy bearing boss 72 traversed by a bearing shaft 73 upon which is mounted the gear 69. A nut 74 on the shaft 73 holds the shaft and the gear 69 in position on the bearing boss 72 and in alignment for mesh with the gears 27 and 67. A brace element 75 is pivotally attached to the inner of the bracket arms 62 and provides a slotted lower end, the slot 76 of which is traversed by the shaft 73. Thus, by moving the shaft and the lower end of the hanger bracket within the slot (Figure 9), the appropriate meshing contact is procured between the three gears, 27, 67 and 69. The nut 74 and a washer 77 are effective for clamping or locking the brace element 75 and the hanger bracket in the finally established position.

Figure 4:
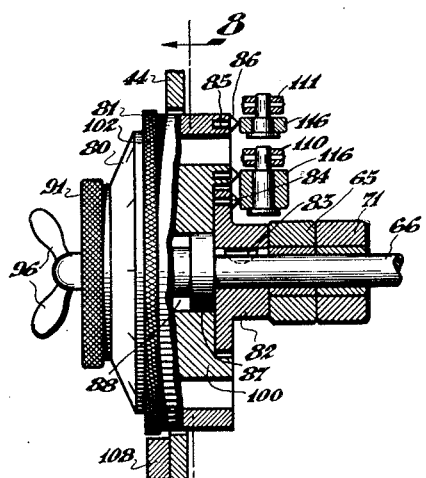
Figure 4 is a fragmentary sectional view taken on line 4—4, Figure 3, showing further details of the adjustable dials and the switch operating levers.

The control dials, which carry the dogs, are mounted upon the outer end of the shaft 66 and may be fixed relative thereto at the desired adjusted positions to produce the cycle of spindle translatory motion desired. In addition to the adjustable dials, indicated generally at 80 and 81, an additional disc 82 is provided (Figure 4). This disc 82 is keyed to the shaft 66 by means of a key 83. It includes a dog 84 projecting from the rear of its disc portion. Thus, it will be apparent that the dog 84, being in fixed relation to the shaft 66 and, therefore, the spindle translating mechanism, will be effective for tripping one of the switch levers at the upper and lower limits of travel of the spindle. The gearing, which drives the shaft 66, is selected as to ratio so as to produce one rotation of the disc 82 for a full travel of movement of the drill or tap spindle. Thus, the dog 84 will positively disconnect the feed at the positive limits of travel of the spindle for safety purposes. The dog 84 and the other dogs hereinafter mentioned, consist in each case (Figure 4) of a rivet-like element having a stud 85 fixed in the disc or dial and a conically shaped head 86 extended from the disc or dial for contacting and swinging the respective switch operating levers.

Figure 8:
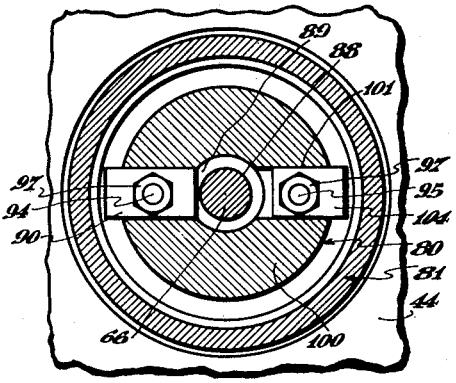
Figure 8 is a fragmentary sectional view taken on line 8—8, Figure 4, illustrating the clamps for securing the dials in adjusted positions.

The dial 80, which limits the depth of the tapping operation, is mounted directly upon the shaft 66. The shaft 66 includes an outer end 87 of increased diameter (Figures 3 and 4). The dial 80 is rotatively adjustable on the enlarged portion of the shaft. The enlarged portion includes an annular groove 88 which provides a shoulder 89. This shoulder 89 cooperates with a clamping lug element 90 (Figures 3 and 8) permitting clamping of the adjustable dial 80 to the shaft.

Figure 2:
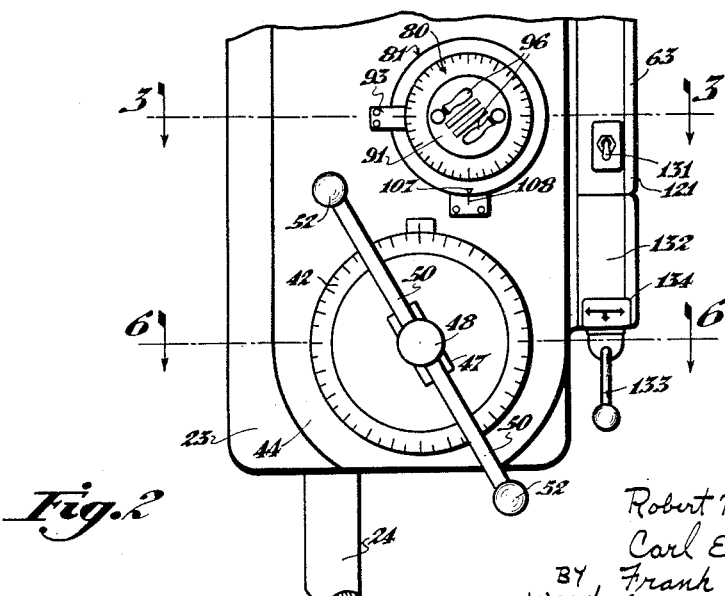
Figure 2 is a fragmentary front view enlarged from Figure 1, showing the lower part of the drill head.

The dial 80 includes a knurled knob element 91, this element 91 lying against the front face of the dial. The dial includes the usual or conventional tapered portion 92 which carries the dial markings. This dial is indexed or set relative to a fixed graduation or point carried by an element 93 secured to the face plate 44 of the drill head (Figure 2). The knurled knob is in the form of a disc or flat circular plate and is held in fixed relationship to the dial 80 by means of the screws 94 and 95 which lock the lower and upper limit control dials in position. Each screw includes an operating handle 96 permitting easy rotation of the screw. The inner ends of the screws are threaded and each carries a nut 97 lying against the respective clamping lug. The lug 90, in the case of the depth control dial 80, includes a contact face 98 engaging the shoulder formed by the groove in the shaft. At its other end, it includes a contact portion 99 engaging the inner face of a slot in the dial 80. The area between these contact portions is relieved. Thus, it will be seen that tightening the screw 94 grips the dial 80 relative to the shaft since it is gripped between the graduated knob element 91 engaging the end of the shaft and the face of the dial, and the clamping lug which engages the shaft at the shoulder and also the bottom of the slot of the disc.

The dial 80, in addition to its dial portion, includes a bearing sleeve portion 100 which is journalled upon the enlarged portion of the shaft 66. This bearing sleeve portion is slotted diametrically as at 101 (Figure 8) to provide the clearance for the respective clamping lugs. The lugs fit snugly within the slots and are, therefore, held against rotative displacement. The inner disc portion of the upper and lower limit dial 82 (Figure 4) fits within a recess in the inner face of the bearing sleeve 100 so that the rear faces of the dials 80 and 82 are flush.

The upper limit control dial 81 is rotatively mounted on the dial 80. The dial 80 includes a counterturned or recessed portion seating the dial 81. The dial 81 is in the form of a sleeve, the inner end of which is flush with the inner faces of the dials 80 and 82 (Figure 4). The forward end of the dial 81 includes an annular knurled knob portion 102 whereby this dial may be gripped and adjusted rotatively to the desired position. The dial 81 includes an annular flange 103 around its inner forward end. The inner face of this flange is not flush with the inner face of the dial 80 of the slot, but is recessed slightly below it so that the clamping lug 90, when tightened, will not grip or secure the dial 81 to the dial 80.

The dial 81 is gripped or attached to the dial 80 by a lug 104 similar to lug 90 and mounted in the same manner, but located diametrically opposite in the slot 101. This lug 104 includes a contact portion 105 at its inner end which engages the rear face of the dial 80 at the base of the slot and the contact portion 106 which grips the inner face of the flange 103 of dial 81. Thus, tightening of the screw passes through this lug 104 will clamp the dial 81 to the dial 80 and, therefore, to the shaft 66. The dial 81 includes an arrow 107 which is set relative to the upper limit reverse pointer element 108. Appropriate plates may be utilized alongside the respective handles for the screws to indicate the left-hand one as the means for setting the upper reverse dial and the right-hand one as effective for setting the depth control dial.

The depth control dial is first set relative to the shaft so as to produce reversal or withdrawal motion of the tap when the proper tapping depth has been reached. This is, of course, accomplished with the drill head set in position relative to the work as clamped beneath the drill head. The upper limit dial is then set so as to discontinue reverse motion of the spindle when the tap is clear of the work, that is, after it has been sufficiently withdrawn to properly clear the work.

Figure 5:
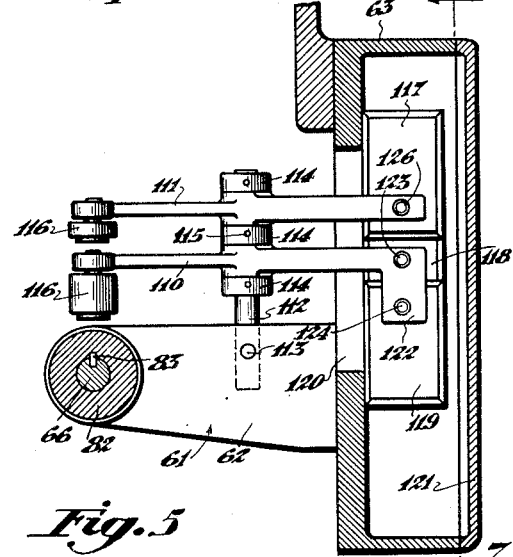
Figure 5 is a sectional view taken on line 5—5, Figure 3, illustrating the switch operating levers.

It will be evident from Figure 4 that the dogs mounted on the limit control disc 82 and the dials 80 and 81 are disposed in the same plane. These dogs operate switch controlling levers (Figure 5). There are two switch control levers, one, namely 110, actuated by the limit dog or the depth control dial, and the other, 111, operated by the upper limit control dial. These levers are pivoted on a shaft 112 mounted in vertical position on one of the arms of the bracket 61. The shaft is socketed in a bore in the bracket 61 fixed therein by means of a pin 113. A series of three collars 114 support and space the switch operating levers on the shaft 112, these collars being held in position by pins 115. Each lever includes a roller 116 at its dog engaging end. The roller on the lower lever is wide enough so as to engage either the limit dog or the depth control dog.

Figure 7:
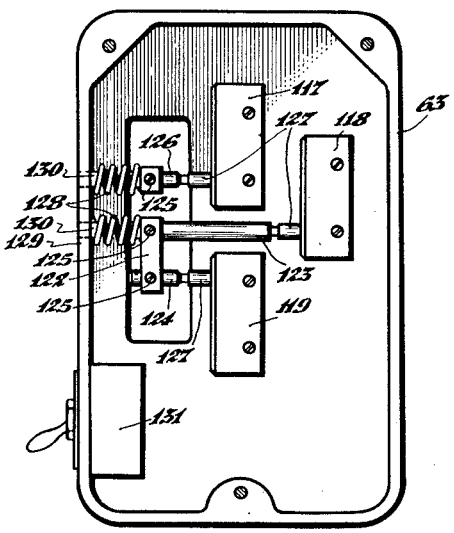
Figure 7 is a sectional view taken on line 7—7, Figure 5, illustrating the switch panel and showing the relationship of the switch operating levers relative to the switch operating members.

These levers control switches 117, 118 and 119 mounted in the switch panel box 63. The switch operating ends of the levers enter the panel box through a clearance opening 120. The panel box is provided with a cover plate 121 for accessibility to the switches. The lower lever 110 operates two switches, namely 118 and 119 (Figure 7). For this purpose, its switch operating end is widened to include a portion 122 extended vertically within the switch panel box. A pair of plungers 123 and 124 are fixed in this end portion 122 for movement in a horizontal plane as the lever is swung on its vertical pivot. These plungers are held in the end of the lever by means of set screws 125. The upper lever 111 includes one plunger 126 held in place by means of a set screw 125. These plungers engage the buttons 127 of the respective switches 117, 118 and 119. One of the switches is offset from the others for clearance purposes and therefore, the upper plunger 123 is of necessity longer for the purpose of extending to the button of this switch 118.

The plungers are constantly urged against the buttons by means of coil springs 128 under compression between the levers and the side wall 129 of the panel box casing. The coil springs are under compression and are centered upon the extended ends of the plungers and upon studs 130 fixed in the casing wall. Thus, the operating ends of the levers are continuously urged against the dogs and when the dogs are displaced from contact will engage the backs of the discs and dials, the switches then being returned to their normal positions as will be explained later in the description of the wiring diagram. In other words, the switches are spring loaded and will always return when the dogs move away from the rollers of the switch levers.

As indicated in Figure 2, the machine includes a switch 131 which enables the operator to throw the electrical controls from tapping circuit to drilling circuit. This switch is the simple toggle lever type which has two manually controlled positions. The switch unit 131 is mounted at the base of the switch panel. Just below the switch panel 63, another switch control box 132 is provided and within this is mounted the manually controlled switches, respectively, "stop," "forward" and "reverse" controls for the motor. These switches will be described in the wiring circuit. The lever for operating these switches is indicated at 133. When this lever, as shown by the indicator arrow plate 134, is moved down, the motor is stopped. When the lever is moved up and to the left, the motor is driven in forward speed, that is, tapping or drilling direction, and when the lever is moved up and to the right, the motor is reversed for reversing the rotation of the spindle as when the tap is withdrawn.

In the operation of tapping a hole, the dials are set in the following manner. The tap is lowered until it is in contact with the top of the work and in position to enter the hole. The depth control dial 80 is then set relative to the index mark on the indicator element 93 so that the depth of the tapping operation, as indicated by the graduations, is adjacent the pointer. The dial 80 is then clamped in position relative to the drive shaft 66 so as to rotate in synchronism with the movement of the tap spindle. The tap is then raised slightly from contact with the work, that is, so as to clear it, and the arrow 107 on the upper limit dial is set in position in registration with the graduation mark on the element 108. This element is then locked to the depth control dial through its clamp and will thus rotate with shaft 66 and be synchronized with the tap spindle.

Therefore, when the tap reaches the correct tap depth, the dog on the depth control dial will operate the appropriate switches, that is, 118 and 119 causing reversal of rotation of the drill spindle and withdrawal of the tap from the screwthreaded hole. As soon as the tap is clear of the work, translation will, of course, cease, but the tap will continue to rotate in the reverse direction. After the head is in position for tapping the next hole, assuming the same threading operation, the operator having raised the tap manually to properly clear the work, the same operation may be repeated.

Figure 11:
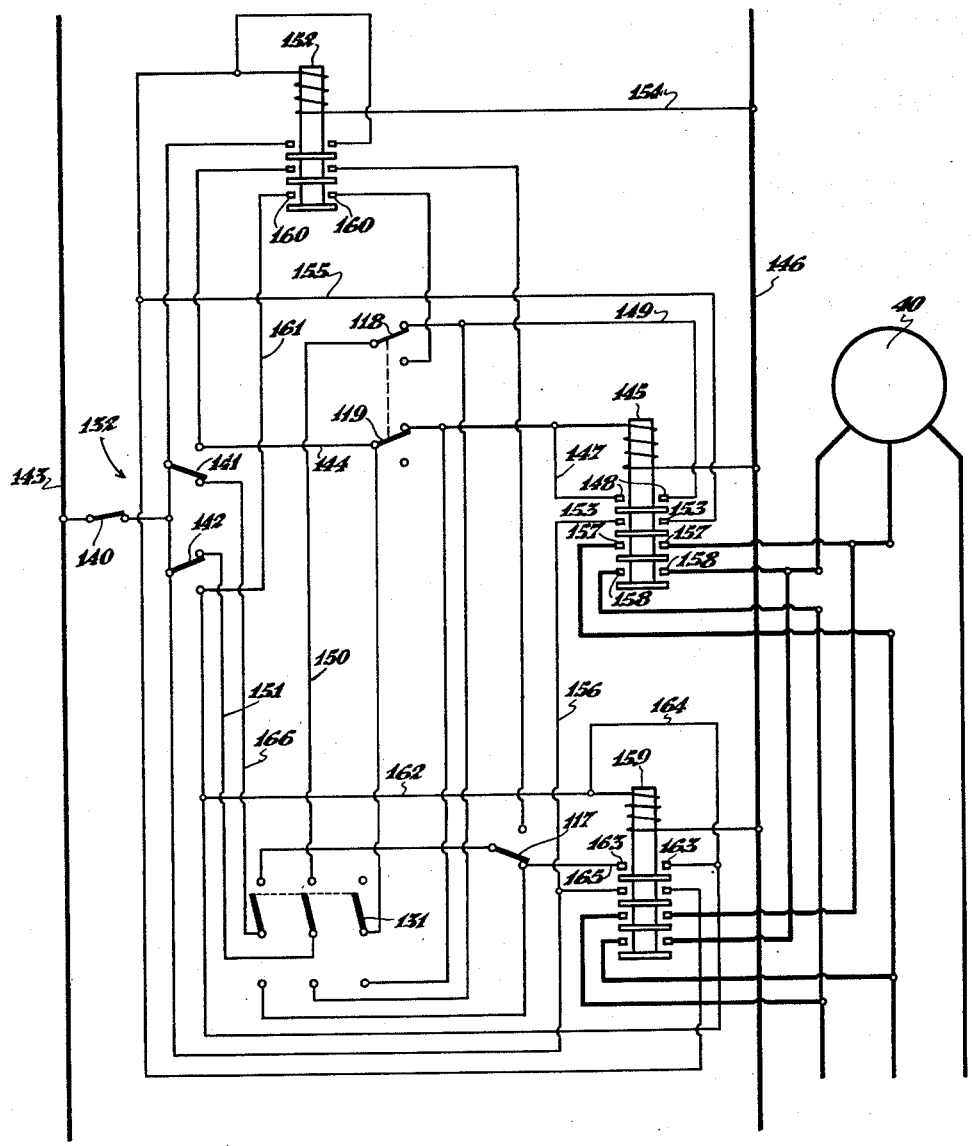
Figure 11 is a wiring diagram illustrating the control and main circuits employed in driving and controlling the feeding operation of the drill spindle.

In order to make clear the circuits employed in the operation of the switches, a wiring diagram is included (Figure 11). The stop switch 140, the forward switch 141 and the reversing switch 142, which are all a part of the switch generally indicated at 132, operated by the lever 133, are normally in the position shown in the diagram. This would mean that the handle 133 is so positioned as to have its indicator at the itnersection of the three arrows included on the plate 134. The lever and switch arrangement is such that these switches will return to this position unless manually held otherwise by means of the lever 133. The switches 117, 118 and 119 are also normally held in position as shown in the diagram. When actuated by the dogs on the dials, these three switches are moved to their other positions. In other words, as long as the dogs are out of contact with the switch operating levers, these three switches will remain in the positions shown in the diagrams. It will be understood from the previous description, that the power feed of the spindle is not used in the tapping operation.

After the operator has set the dials, as previously described, to determine the upper and lower points of reversal, the tapping operation is instituted by moving the control lever 133 to position for causing forward rotation of the tap spindle, that is, rotation in a direction that will feed the tap into the work. The tap spindle is lowered to thread cutting position manually. When the switch 141 is moved upwardly from the position shown in Figure 11, a control circuit is completed from the power line 143, through the stop switch 140, through switch 141, control lead 144, through limit switch 119, through the coil of the solenoid controlled relay 145 which controls forward motion of the motor 40, the lead 144 connecting to the main power line 146.

As the solenoid is energized, the relay for forward motor speed is closed. This establishes a holding circuit for the relay by way of lead 147, contacts 148, lead 149, limit switch 118, lead 150, selector switch 131 and finally to power line 143 by way of lead 151 and reversing switch 142. At this time, the solenoid controlled relay 152 is energized by the closing of contacts 153—153 of the relay 145. The circuit, in this case, is through the control line 154, the winding of the solenoid, lead 155, through the contacts 153—153 to lead 156 and thence to power line 143.

The motor connections are completed for starting forward rotation of the tap spindle by closing of the contacts 157—157 and 158—158 of the relay 145. The motor is a three phase motor and it is not believed necessary to trace the circuits establishing the forward rotation of the motor since the control of forward and reverse directions of motion of this type of motor are fully understood.

The tap spindle threads the tap in the hole and continues the tapping operation until the dial 80 rotates the required amount to cause operation of the switch lever 110 through the appropriate dog, and thus to operate the limit switches 118 and 119 to move them to positions opposite from those shown in Figure 11. The change of position of switches 118 and 119 deenergizes the solenoid of relay 145, and the contacts previously established for forward speed of the motor are disconnected, the motor thereupon stopping. The breaking of the control connection and the holding circuit to the solenoid 145 will be evident since the control circuit between the main power lines 143 and 146 is broken at the respective switches 118 and 119.

The change of position of switch 118 is effective for energizing the solenoid of reversing relay 159 and, therefore, causing reversal of the motor connections which causes the tap to be threaded out of the completed tap hole. The control circuit accomplishing this energization of the solenoid 159 passes through the reversing switch 142, the lead 151, the selector switch 131, the switch 118, the solenoid operated relay 152 by way of the contacts 160—160, the lead 161 and the lead 162 which passes through the coil of solenoid operated relay 159 and thence is connected to the power line 146. The relay 159 is held by a holding circuit controlled by the contacts 163. The current flows through these contacts by way of the lead 164, lead 165, upper limit switch 117, the selector switch 131 and thence through the forward control switch 141 by way of lead 166 and across to the power circuit 143.

As previously described, the tap spindle will be translated upwardly as the tap is threaded out of the hole by reversal of motion of the motor. When the tap is clear of the hole, translation will cease, but the motor will continue to operate in reverse direction. The operator then translates the spindle upwardly by hand preceding the next tapping operation. Assuming that the tapping operations are all of the same depth and in the same relation to the work, the next tapping cycle is inaugurated by translating the spindle upwardly until the upper limit dog moves the upper limit switch 117 to position opposite to that shown in Figure 11. Reversal of position of switch 117 deenergizes the solenoid of relay 159 to discontinue the reversing connections, and at the same time establishes connections through the relay 152 and switch 119 to again energize solenoid 145 to start forward or tapping rotation of the motor. The holding circuit for relay 159 is disconnected at the switch 117 since the lead 165, extended through lead 166, is disconnected at the selector switch since the selector switch is in tapping position. The control circuit for the solenoid 159 is disconnected at the switch 118.

The solenoid operated relay 152 is included for reasons of safety. It prevents the motor from being started accidentally if the operator, in setting up the machine for a tapping operation, moves the spindle up and down by hand with the selector 131 set at tap position. Since hand movement of the spindle will rotate the dials, there is presented the possibility of switches 118 and 117 starting the motor. Switches 118, 119 and 117 are connected through the relay 152 and are only effectively operated at such times when relay 152 is energized. Relay 152 is closed by the energizing of either solenoid 145 or 159. Movement of the forward or reverse lever is necessary to the closing of these relays preliminary to the closing of relay 152. Thus, a circuit is provided which cannot accidentally start the motor and must depend on the action of the main control lever 133 for stopping or controlling forward or reversing motions of the motor.

When the operator sets the selector switch 131 to the drilling position, the automatic reversing functions of switches 118, 119 and 117 are eliminated and direction of the spindle rotation is governed by the operation of the lever 133. As previously explained, the range of translation of the spindle is controlled by the upper and lower limit dog 84.

Having described our invention, we claim:

1. A drill head for a radial drill or the like comprising; a housing, a spindle rotatably and translatably mounted in said housing and adapted selectively for mounting a drill or a tap, a depth control dial, connecting means between said drill spindle and said depth control dial to cause rotation of the dial relative to the longitudinal translation of said spindle, means for changing the setting of said depth control dial relative to said spindle, a trip dog on said depth control dial, a reversible motor in driving connection with said spindle, control switches in connection with said motor and associated with said trip dog, and a manually operated two-position selector switch in electrical connection with said control switches operable in one position to render the said control switches effective to cause reversal of said motor at a predetermined limit of spindle translation during a tapping operation, said manually operated selector switch being operable in a second position to render the control switches effective to cause said motor to be deenergized at a predetermined limit of spindle travel during a drilling operation.

2. An apparatus for automatically controlling a tapping machine comprising; a spindle mounted for longitudinal translation relative to a work surface, a reversible motor in driving connection with said spindle for imparting rotary motion thereto, a control circuit in connection with said motor, respective switches in electrical connection with said control circuit for energizing said motor in forward and reverse directions, a depth control dial in driving connection with said spindle and arranged to rotate as said spindle is translated longitudinally, an upper limit control dial associated with said depth control dial, a respective actuating dog on each of said dials, a pair of levers pivotally mounted adjacent the dials upon a common center, the said levers each having their inner ends in operable relationship with a respective trip dog and their outer ends in operative association with said respective switches to reverse said motor at the upper and lower predetermined limits of spindle travel, clamping means for setting the position of said depth control dial relative to said spindle, means on said depth control dial for setting said upper limit dial relative to the depth control dial to adjust said actuating dogs relative to each other and to the spindle whereby said control system is energized to reverse said motor at the upper and lower predetermined limits of spindle travel.

3. An apparatus for controlling a tapping machine comprising; a spindle mounted for longitudinal translation and adapted to follow the tap during a tapping operation, a reversible motor in driving connection with said spindle for imparting rotary motion thereto, a control circuit in connection with said motor for energizing said motor in forward and reverse directions, a depth control dial, a shaft for mounting said dial, rack teeth on said spindle, a gear train in mesh with said rack teeth and in driving connection with said dial shaft to rotate the dial as said spindle is translated longitudinally, a trip dog on said dial in operative association with said control circuit to reverse said motor at a predetermined lower limit of spindle travel, clamping means between said dial and mounting shaft to set the dial relative to the shaft for a lower limit of spindle travel, an upper limit dial rotatably journalled upon said depth control dial, clamping means between said respective dials for setting the upper limit dial relative to the depth control dial, and a trip dog on said upper limit dial in operative association with said control circuit to reverse said motor at a predetermined upper limit of spindle travel.

4. An apparatus for automatically controlling a drilling or tapping operation comprising; a spindle mounted for longitudinal translation relative to a work surface, a reversible motor in driving connection with said spindle for imparting rotary motion thereto, a control circuit in connection with said motor, respective switches in electrical connection with said control circuit for energizing said motor in forward and reverse directions, a depth control dial in driving connection with said spindle and arranged to rotate as said spindle is translated longitudinally, an upper limit control dial associated with said depth control dial, a respective trip dog on each of said dials in operative association with said switches to reverse said motor at the upper and lower limits of spindle travel, adjustment means for setting said depth control dial relative to said spindle, means on said depth control dial for setting said upper limit dial relative to the depth control dial, to adjust said dial trip dogs relative to each other and to the spindle whereby said control system is energized to reverse said motor at the upper and lower predetermined limits of spindle travel, and a fixed dog on the driving connection between the spindle and depth control dial engageable with one of said switches to reverse the motor at the final limit of spindle translation.

5. A drill head for a radial drill or the like comprising; a housing, a spindle rotatably and translatably mounted in said housing and adapted selectively for mounting a drill or a tap, a reversible motor for driving said spindle, mechanical means in connection with said motor for translating said spindle by power, a manually operated clutch for disengaging said means for translating the spindle to a selected position relative to a work surface, a depth control dial journalled in said housing, connecting means between said drill spindle and said depth control dial to cause rotation of the dial relative to the longitudinal translation of said spindle, release means for changing the setting of said depth control dial relative to the longitudinal position of said spindle, a tripping device on said depth control dial, control switches in connection with said motor and associated with said tripping device, a fixed trip dog associated with the said dial connecting means and adapted to actuate the control switches to deenergize the motor at the final limit of spindle translation, and a two-position manually operated selector switch in electrical connection with said control switches operable in one position to render the control switches effective to reverse said motor at a predetermined limit of spindle translation during a tapping operation, said manually operated selector switch being operable in a second position to render the control switches operable to cause said motor to be deenergized at a predetermined limit of spindle travel during a drilling operation.

6. An apparatus for automatically controlling a tapping or drilling operation, comprising; a spindle mounted for longitudinal translation and adapted to follow a tap during a tapping operation, a reversible motor in driving connection with said spindle for imparting rotary motion thereto, adjustable upper and lower spindle translation control dials in driving connection with said spindle and arranged to rotate as the spindle is translated, a respective trip dog on each of said dials, a pair of electrical switches operatively associated with said dials for actuation by said trip dogs, a respective reversing relay in electrical connection with each of said respective switches and with said motor to reverse the same when either of said switches is actuated by said actuating dogs, each of the reversing relays having a self-holding circuit, and a manually operated switch lever having a pair of two-position switches, each of said switches being arranged to complete the holding circuit of a respective reversing relay in one position and in a second position being arranged to open the holding circuit and energize the other reversing relay to cause reversal of motor rotation independently of said trip dogs and associated electrical switches.

7. An apparatus for controlling the translation of a tapping spindle comprising, a drill head, a spindle mounted for longitudinal translation relative to the head and adapted to follow a tap during a tapping operation, a reversible motor in driving connection with the spindle for rotating the same, an electrical control system in connection with the motor for driving the same in forward and reverse directions, a control shaft in driving connection with the spindle and adapted to rotate during translation of the spindle, a dial loosely mounted upon said shaft, a second dial loosely mounted upon the first mentioned dial with the inner faces of the said dials in flush relationship, means for clamping the dials to one another and to the said control shaft, a respective trip dog mounted upon the face of said first and second dials, control switches mounted upon the said drill head adjacent said dials and in electrical connection with the control system for regulating the operation of the reversible motor, a pair of levers mounted upon a common center adjacent said dials, the respective inner ends of said levers being tracked upon the respective inner faces of the dials and in operating relationship with the said dogs mounted upon the faces of the dials and having their opposite ends arranged to actuate the said control switches, the said dogs being operable to condition the control circuit to reverse the direction of motor operation at the limits of spindle translation as determined by the adjustment of the dials relative to one another.

8. An apparatus for controlling the translation of a tapping spindle comprising, a drill head, a spindle mounted for longitudinal translation relative to the head and adapted to follow a tap during a tapping operation, a reversible motor in driving connection with the spindle for rotating the same, an electrical control system in connection with the motor for driving the same in forward and reverse directions, a shaft in driving connection with the spindle and adapted to rotate during translation of the spindle, adjustable dials loosely mounted upon said shaft and having their inner faces in flush relationship, a device for clamping the dials in adjusted position relative to said shaft, trip dogs mounted upon the inner faces of said dials, control switches in electrical connection with the control system for regulating the operation of the reversible motor, a switch casing mounted upon the side of the drill head adjacent the said dials for mounting the said switches, levers pivotally mounted adjacent said dials, the inner ends of said levers being tracked against the inner faces of the said dials and adapted to be actuated by said trip dogs and having their opposite ends extended into the said switch casing and arranged to actuate the said control switches upon rotation of the dials in response to spindle translation, the said switches being adapted to reverse the direction of motor rotation upon actuation of the control switches by the levers at the limits of spindle translation.

9. An apparatus for controlling the translation of a tapper spindle adapted to mount a tap comprising; a drill head, a spindle mounted in said drill head and arranged for longitudinal translation relative thereto, a reversible electric motor for rotating said spindle, said spindle being arranged to slide longitudinally during a tapping operation whereby the tap is adapted to thread itself into a hole, a rotary depth control device in driving connection with said spindle, trip means on said rotary depth control device, a control circuit arranged to be regulated by said trip means, the said reversible motor being adapted to be energized in forward and reverse directions and to be deenergized by said control circuit, a three-position manually operated control lever, a set of three switches operatively connected to the said control lever and arranged to be actuated individually at the respective three positions of the control lever, one of said switches being in electrical connection with said control circuit for energizing said motor in forward tapping direction upon manual actuation of the lever to one of said three positions whereby the motor drives the spindle in tapping direction until the trip means of the rotary depth control device regulates the control system to reverse said motor to cause the tap and spindle to unscrew from the tapped hole, the remaining pair of switches being in electrical connection with said control circuit and being operable respectively to deenergize or reverse the motor upon manual actuation of the said control lever respectively to the other two positions of the control lever.

ROBERT N. KNOSP.
CARL E. LINDEN.
FRANK O. WETZEL.

REFERENCES CITED

The following references are of record in the file of this patent:

UNITED STATES PATENTS

| Number | Name | Date |
|---|---|---|
| Re. 20,579 | Bishop et al. | Dec. 14, 1937 |
| | (Original No. 1,970,218) | |
| 408,698 | Eberhardt | Aug. 13, 1889 |
| 1,648,820 | Phillips | Nov. 8, 1927 |
| 1,991,927 | Herrmann et al. | Feb. 19, 1935 |
| 2,257,364 | Bakewell | Sept. 30, 1941 |
| 2,345,318 | Bakewell | Mar. 28, 1944 |